United States Patent
Mehring et al.

(10) Patent No.: US 10,487,708 B2
(45) Date of Patent: Nov. 26, 2019

(54) REDUCTANT TANK AS A HEAT STORAGE DEVICE

(71) Applicant: Ford Global Technologies, LLC, Dearborn, MI (US)

(72) Inventors: Jan Mehring, Cologne (DE); Thomas Lorenz, Cologne (DE); Hans Guenter Quix, Herzogenrath (DE); Jan Linsel, Cologne (DE); Moritz Klaus Springer, Hagen (DE); Florian Huth, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 15/418,617

(22) Filed: Jan. 27, 2017

(65) Prior Publication Data
US 2017/0226904 A1    Aug. 10, 2017

(30) Foreign Application Priority Data
Feb. 10, 2016    (DE) .................. 10 2016 201 999

(51) Int. Cl.
| | | |
|---|---|---|
| *F01M 5/02* | (2006.01) | |
| *F01N 3/20* | (2006.01) | |
| *F01M 5/00* | (2006.01) | |

(52) U.S. Cl.
CPC ............ *F01M 5/021* (2013.01); *F01M 5/001* (2013.01); *F01N 3/2006* (2013.01); *F01N 3/2066* (2013.01); *F01N 2610/02* (2013.01); *F01N 2610/10* (2013.01); *F01N 2610/1406* (2013.01); *Y02A 50/2325* (2018.01); *Y02T 10/24* (2013.01)

(58) Field of Classification Search
CPC . F01M 5/021; F01M 5/001; F01P 1/00; F01N 3/2006; F01N 3/2066; F01N 2610/02; F01N 2610/10; F01N 2610/1406; Y02T 10/24
USPC .......................................... 60/273
See application file for complete search history.

(56) References Cited

U.S. PATENT DOCUMENTS

| | | | |
|---|---|---|---|
| 8,459,013 B2 | 6/2013 | Hosaka et al. | |
| 2007/0079599 A1* | 4/2007 | Osaku | F01N 3/2066 60/283 |
| 2011/0030349 A1 | 2/2011 | Makartchouk et al. | |
| 2013/0168073 A1* | 7/2013 | Dean | F15B 21/042 165/286 |

(Continued)

FOREIGN PATENT DOCUMENTS

| | | |
|---|---|---|
| CN | 102852602 A | 1/2013 |
| DE | 4432577 A1 | 3/1996 |

(Continued)

*Primary Examiner* — Laert Dounis
*Assistant Examiner* — Kelsey L Stanek
(74) *Attorney, Agent, or Firm* — Geoffrey Brumbaugh; McCoy Russell LLP (57) ABSTRACT

A method for operating an engine system is provided. The method includes during a first operating condition, flowing oil from an oil sump to a heat exchanger attached to a reductant tank and transferring heat from oil flowing through the heat exchanger to reductant stored in the reductant tank. The method further includes during a second operating condition, flowing oil from the oil sump to the heat exchanger and transferring heat from the reductant stored in the reductant tank to oil flowing through the heat exchanger.

12 Claims, 7 Drawing Sheets

(56) References Cited

U.S. PATENT DOCUMENTS

2016/0040577 A1* 2/2016 Nihongi .............. F01N 3/2066
73/49.5

FOREIGN PATENT DOCUMENTS

| DE | 102010029269 A1 | * | 12/2011 | ........... F01N 3/2066 |
|----|-----------------|---|---------|-------------------------|
| DE | 202015100468 U1 | * | 2/2015  | .............. B60S 1/487 |
| DE | 102014007707 A1 |   | 12/2015 |                         |
| DE | 102015200534 B3 |   | 3/2016  |                         |
| WO | 2009014516 A1   |   | 1/2009  |                         |
| WO | 2011000852 A1   |   | 1/2011  |                         |

* cited by examiner

REDUCTANT TANK AS A HEAT STORAGE DEVICE

CROSS REFERENCE TO RELATED APPLICATION

The present application claims priority to German Patent Application No. 102016201999.6, filed Feb. 10, 2016. The entire contents of the above-referenced application are hereby incorporated by reference in its entirety for all purposes.

BACKGROUND/SUMMARY

Internal combustion engines generate waste heat which can be captured by heat storage devices for use by other systems at subsequent periods. For instance, reservoirs storing fluid heated by engine coolant have been employed in some internal combustion engines. The energy in the heated fluid can be transferred to different engine systems. However, these heat reservoirs can be costly, bulky, and susceptible to damage. Moreover, previous operating methods for systems with heat storage reservoirs can interfere with other engine systems, such as cabin heating systems, necessitating tradeoffs in the control strategies of the different systems.

In one approach, to overcome at least some of the aforementioned drawbacks, a method for operating an engine system is provided. The method includes during a first operating condition, flowing oil from an oil sump to a heat exchanger attached to a reductant tank and transferring heat from oil flowing through the heat exchanger to reductant stored in the reductant tank. The method further includes during a second operating condition, flowing oil from the oil sump to the heat exchanger and transferring heat from the reductant stored in the reductant tank to oil flowing through the heat exchanger. The method enables heat energy to be transferred back and forth between the engine lubrication system and the reductant injection system to capture, store, and then later utilize the heat energy to improve engine warming during cold starts. The heat management method therefore enables engine cold start lubrication to be improved to reduce engine component wear and fuel consumption. Moreover, transferring heat energy to the reductant tank also enables operational improvements in the reductant injection system, allowing reductant to be injected at desired temperatures during engine operation and reduces the likelihood of the reductant solidifying in the reductant tank while the engine is not in operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Devices for storing heat have been used in previous internal combustion engines for recovering energy from the waste heat of internal combustion engines. These devices are concerned especially with storing heat which has been removed from an internal combustion engine of a motor vehicle by coolant, for example. "Heat storage devices" store the waste heat of the internal combustion engine which is produced during the operation thereof and has been removed therefrom in order to feed it back to the cold internal combustion engine when a cold start is next performed. It is thereby possible to reduce the friction of component parts of the internal combustion engine and also of components of a motor vehicle, such as a transmission, in the starting phase, which means that there is less wear and also lower fuel consumption. Heat storage devices can be installed in motor vehicles having internal combustion engines, but, owing to their size, take up a certain amount of space. Moreover, they increase the weight of the corresponding motor vehicle. It therefore may be an objective of the system described herein to provide a heat storage facility which is efficient with respect to space requirements and the overall weight of a corresponding motor vehicle.

A method for storing heat in a system of an internal combustion engine having a urea tank is described herein.

In one example, a method may be provided for heat management in a system of a combustion engine having at least one coolant circuit comprising at least one first coolant line, a first control valve, a second coolant line, at least one urea tank, and at least one heat exchanger in contact with the urea tank and the second coolant line, wherein the first and the second coolant line are connected fluidically by the control valve, and a fluid coolant is transferred via the first coolant line and the second coolant line from the combustion engine to the heat exchanger, and wherein heat energy is exchanged by means of the heat exchanger between the coolant and an aqueous urea solution stored in the urea tank. In this way, the urea tank acts to store the waste heat of the internal combustion engine which is produced during the operation thereof and has been removed therefrom in order to transfer the heat energy back to the cold internal combustion engine during a subsequent cold start. It is thereby possible to reduce the friction of component parts of the internal combustion engine and also of components of a motor vehicle, such as a transmission, in the starting phase, which means that there is less wear and also lower fuel consumption.

Urea solutions may be used in the context of the selective catalytic reduction of nitrogen oxides in the exhaust gas of internal combustion engines, particularly those which burn diesel. In this process the ammonia, which reacts with the nitrogen oxides in the exhaust gas to form nitrogen and water, is obtained from hydrolysis of an aqueous urea solution made available. For this purpose, a desired volume in the form of a tank for the urea solution may be provided. This tank, which is referred to as a urea tank, can advantageously be used to store energy removed from the internal combustion engine. The urea tank may be thermally insulated, ensuring that the aqueous urea solution held in the interior of the scrubbing liquid tank is thermally insulated from the surrounding vehicle, thereby enabling losses of the thermal energy stored in the urea tank to the environment to be counteracted.

The method may be advantageous because there may be no need to make available any space for an additional heat storage device, if desired. No additional weight, or only a small amount of weight due to devices for heat transfer, is added by the urea tank, arranged independently of its use as a heat storage device. Moreover, the urea solution is heated in the method, which has an advantageous effect on efficient hydrolysis of the urea solution in the exhaust tract and the reaction of the ammonia with nitrogen oxides in the selective catalytic reduction. Furthermore, the method may save energy because the urea tank may need less electric heating at freezing temperatures by a corresponding electric heating device than would be the case without the supply of heat. Thus, efficient use of the waste heat produced by the internal combustion engine can be achieved in the method.

In this context, the term heat management refers to the removal of heat from a device, in particular the internal combustion engine, heat exchange between media and storage of heat, in particular in the urea tank, for subsequent transfer back to the internal combustion engine. The method may be carried out in a motor vehicle. In this case, heat can be removed not only from the actual internal combustion engine but also from other drive components of the motor vehicle, e.g., a transmission or an exhaust system. Water, for example, or a suitable aqueous solution is used as a coolant. Oil can also be used to remove heat from an internal combustion engine; the term oil is used to make a distinction with respect to conventional coolants.

In another exemplary method, the urea tank may be used to store heat energy which is transferred from the coolant to the urea solution when the temperature of the coolant is higher than that of the urea solution. For a similar density and specific heat capacity, the relatively large volume of the urea tank may allow significantly larger amounts of energy to be stored than is the case with conventional heat storage devices.

In another example, the urea tank may release heat energy by transferring energy from the urea solution to the coolant when the temperature of the urea solution is higher than that of the coolant.

In another example, a system of the combustion engine may additionally have an oil circuit including a first oil line, which can be connected to a second oil line by an oil control valve in order to transfer heat between the combustion engine and the urea tank. Through use of the oil line, it may be advantageously possible to pass oil which is being used to cool the internal combustion engine via a dedicated line to the heat exchanger, where the heat of the oil may be transferred to the urea solution in the urea tank. In the case of cold starting of the internal combustion engine, the oil may also be heated by transferring heat from the urea solution. In an alternative embodiment of the method, it is also possible to make exclusive use of oil to transfer the waste heat of the internal combustion engine to the heat exchanger and hence to the urea tank.

The method may be suitable in systems having auto-ignition internal combustion engines since selective catalytic reduction, for which urea is desired in order to provide ammonia, is carried out particularly to clean diesel exhaust gases. However, the method may also be used in systems having applied-ignition internal combustion engines.

In another example, the urea tank may have at least one recess in at least one side, in which recess the heat exchanger is accommodated in the circumference of the urea tank. In this case, the heat exchanger is as it were integrated into the urea tank, although it may not completely surrounded by the material of the urea tank since the first coolant line is connected to the heat exchanger, for example.

In another example, the heat exchanger may be arranged in contact with at least one outer side of the urea tank. In this case, the heat exchanger may not be accommodated in the circumference of the urea tank but rests against an outer side. However, the heat exchanger can rest against the urea tank in a recess (e.g., shallow recess) in one side of said tank.

In another example, a urea line, in which at least one urea pump is arranged, may be arranged between the urea tank and an injection device for injecting the urea solution into the exhaust tract of the combustion engine, wherein at least one branch line for returning the urea solution to the urea tank furthermore branches off from the urea line, wherein the branch line runs through the heat exchanger, and wherein the urea solution is circulated at least in part through the heat exchanger by means of the urea pump. In this circuit, the urea solution can flow back to the urea tank through the action of the urea pump, thereby improving heat transfer between the coolant and the urea solution, particularly from the urea solution to the coolant. Further pumps and valves can be arranged in the urea line and the branch line, e.g., in order to regulate the flow of urea. For example, the urea line may be blocked by the action of a valve and the urea solution may circulate back (e.g., completely back) to the urea tank. This may be carried out in operating situations in which no urea is being introduced into the exhaust tract.

In another example, a system is provided for heat management, including an internal combustion engine having at least one coolant circuit comprising at least one first coolant line, at least one first control valve, at least one second coolant line, at least one urea tank, and at least one heat exchanger, which is in contact with the second coolant line and the urea tank. The advantages of the system correspond to those of the method.

In another example, the system may be used for heat management.

In another example, the system may be included in a motor vehicle. The motor vehicle may use a diesel engine for propulsion. However, the use of a spark ignition engine has also been contemplated.

Figure 1:
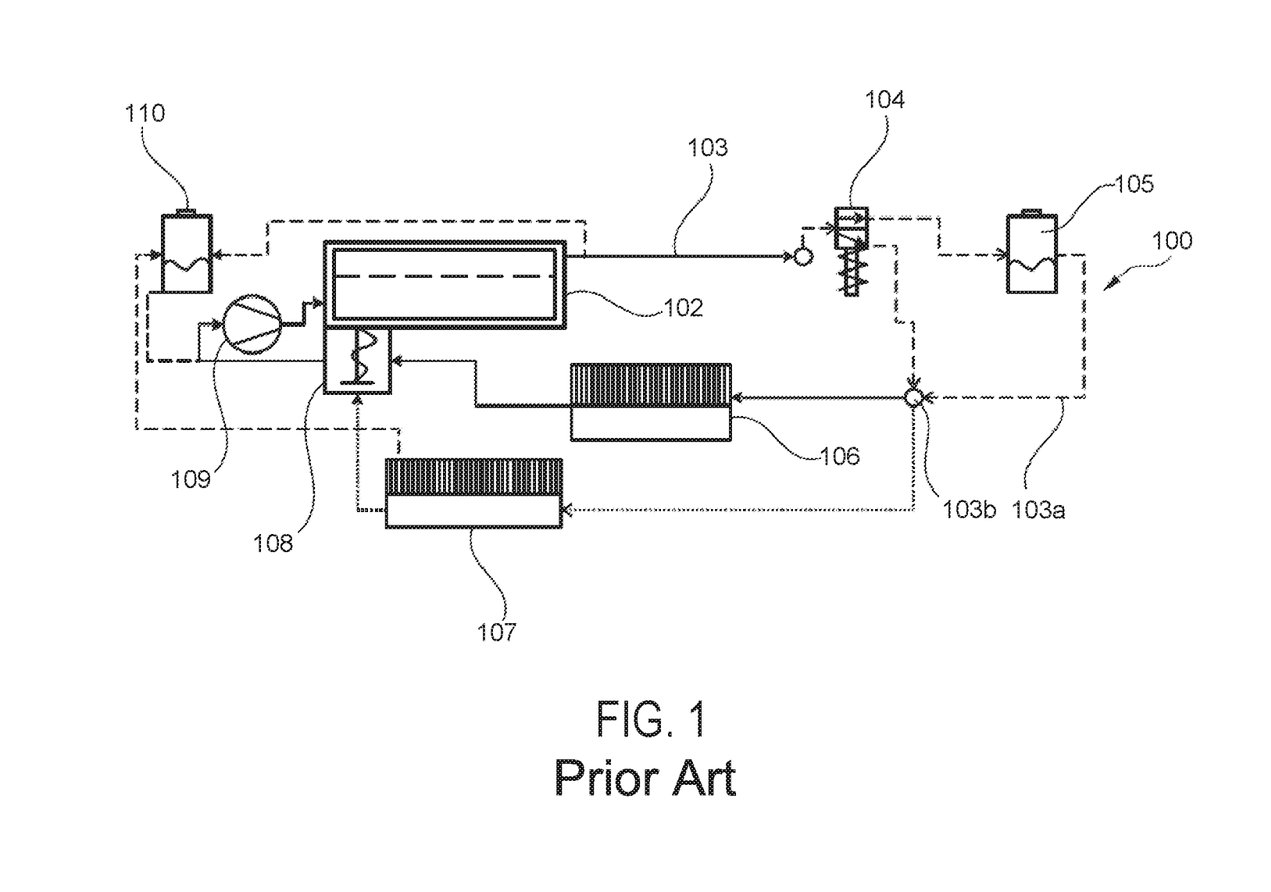
FIG. 1 shows a schematic illustration of a system of an internal combustion engine according to the prior art.

In a prior art system 100 shown in FIG. 1 heat is transferred and stored, for example. In this case, heat from an internal combustion engine 102 is removed from the internal combustion engine 102 by means of a coolant (e.g., water) through a first coolant line 103 in a coolant circuit. By means of a first control valve 104, the coolant circuit can be coupled to and decoupled from a heat storage device 105 by connecting the first coolant line 103 fluidically to a second coolant line 103a. The second coolant line 103a leads to the heat storage device 105. By means of the coolant, the waste heat from the internal combustion engine 102 is transferred to the heat storage device 105. The heat storage device 105 is used to store this heat until it can be transferred back to the internal combustion engine 102 when desired by means of the coolant. In this system, a heat exchanger (not shown here) is used to transfer the thermal energy contained in the coolant to the storage medium held in the heat storage device 105 and vice versa. There can thus be an exchange of thermal energy between the internal combustion engine 102 and the heat storage device 105 and vice versa. A latent heat storage device known per se can be used as a heat storage device 105, for example, said latent heat storage device having as a storage medium a "phase change material", the latent heat of fusion, heat of solution or heat of absorption of which is significantly greater than the heat which it can store on the basis of its normal specific heat capacity without the phase change effect.

The second coolant line 103a rejoins the first coolant line 103 at junction point 103b. Ideally, a switching valve is also arranged at the junction point 103b. The coolant circuit in the system 100 shown in FIG. 1 furthermore comprises a heating device 106 for heating an interior of a motor vehicle in which the system is located, a cooling device 107 for releasing thermal energy absorbed in the coolant to the environment of the vehicle, a thermostat 108 and a first coolant pump 109, which is usually driven by the internal combustion engine 102 and by means of which the coolant is circulated through the coolant circuit, as indicated by the arrows in FIG. 1. In this system, the heat storage device 105 is incorporated into the coolant circuit, and thus coolant line 103 leads from the internal combustion engine 102 to the heat storage device 105 and onward from the latter to the heating device 106 and/or to the cooling device 107. The coolant circuit furthermore comprises a coolant reservoir 110, from which the coolant circuit is supplied with coolant.

Figure 2:
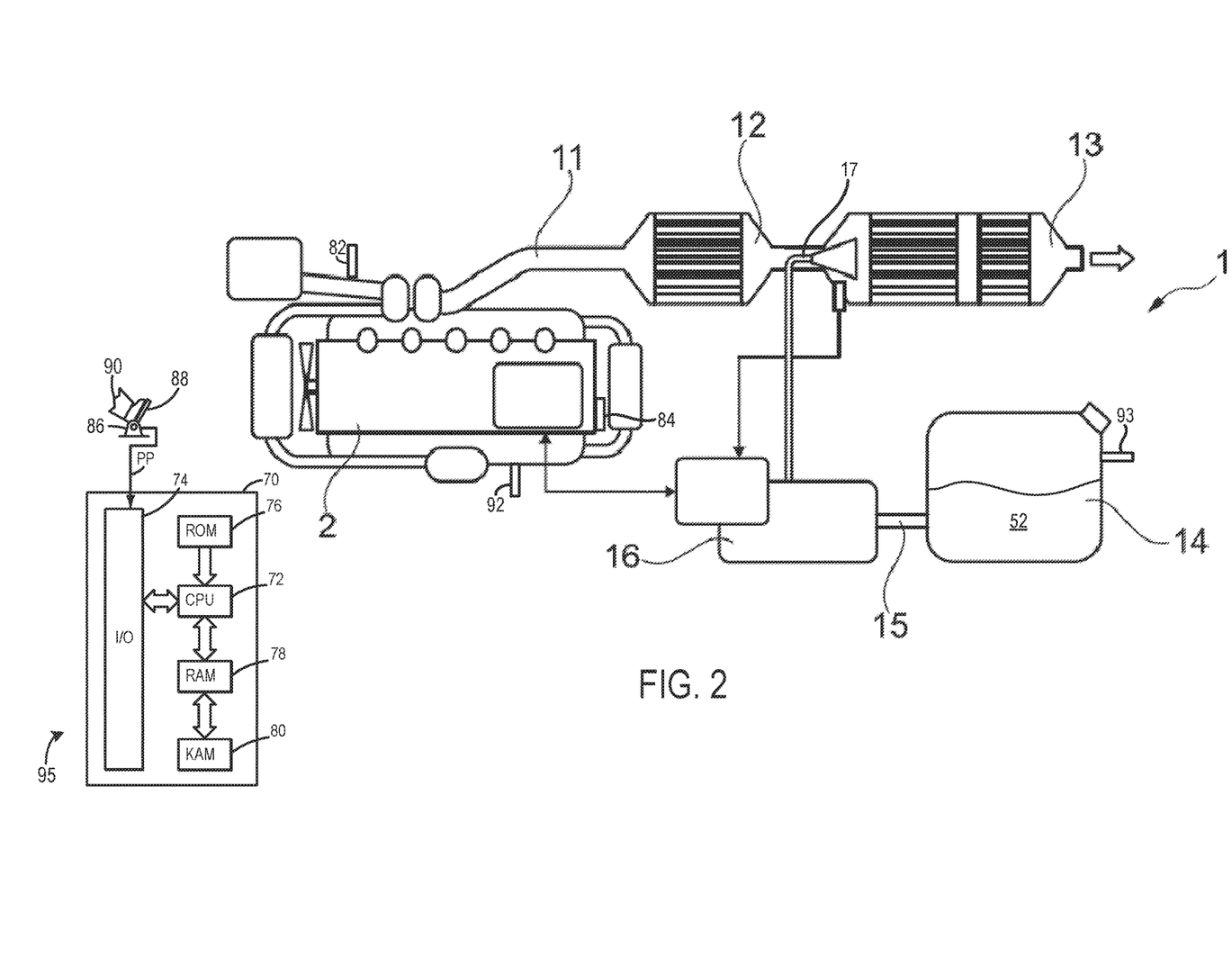
FIG. 2 shows a schematic illustration of a system of an internal combustion engine having an exhaust gas purification system.

FIG. 2 shows a system 1 (e.g., engine system). For exhaust gas treatment, catalyst systems may be arranged in an exhaust tract 11 of an internal combustion engine 2. In the system 1 in accordance with the illustration in FIG. 2, an oxidation catalyst and a particulate filter are located in a first catalyst system 12, and a catalyst for selective catalytic reduction (SCR) and an additional oxidation catalyst as well as an additional particulate filter may be located in a second catalyst system 13. The oxidation catalysts may be diesel oxidation catalysts. The particulate filters may be diesel particulate filters. Further devices in the catalyst systems may include three-way catalysts and nitrogen oxide storage catalysts. A urea tank 14 is provided to store a urea solution 52 (e.g., aqueous urea solution) or another type of reductant solution. Thus, the urea tank may more generally be a reductant tank, in other examples. The urea or other reductant may be introduced into the exhaust tract upstream of the second catalyst system via a urea line 15 by means of a urea metering device 16 and a urea injection device 17 configured to inject urea or another reductant into the exhaust tract 11. It will be appreciated that the urea metering device may more generally be a reductant metering device and the urea injection device may more generally be a reductant injection device, in other examples. In the exhaust tract, the urea solution may be converted into ammonia, which may be used as a reducing agent for reducing nitrogen oxides to nitrogen in the SCR catalyst.

FIG. 2 also depicts a controller 70. Controller 70 is shown in FIG. 2 as a microcomputer, including microprocessor unit 72, input/output ports 74, an electronic storage medium for executable programs and calibration values shown as read only memory chip 76 in this particular example, random access memory 78, keep alive memory 80, and a data bus. Controller 70 may receive various signals from sensors coupled to the engine 2 and/or corresponding engine systems. For example, the controller 70 may receive measurement of inducted mass airflow (MAF) from a mass airflow sensor 82; engine coolant temperature (ECT) from temperature sensor 84; a pedal position (PP) from a pedal position sensor 86 coupled to a pedal 88 actuated by an operator 90; absolute manifold pressure signal, MAP, from sensor 92; and a reductant temperature from temperature sensor 93. Engine speed signal, RPM, may be generated by controller 70 based on a signal from an engine speed sensor, for instance. The engine speed sensor may produce a predetermined number of equally spaced pulses every revolution of a crankshaft. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. Controller 70 may be included in a control system 95 configured to receive sensor signals from sensors in the engine and send commands to various actuators in the engine. Moreover, the controller 70 may be configured to implement the methods and other engine control techniques described herein, such as the method depicted in FIGS. 9 and 10. Specifically, the controller 70 may be configured to command adjustment of the injection device 17, the metering device 16, a reductant pump, a reductant control valve, a coolant control valve, coolant pumps, oil pumps and/or an oil control valve included in the system 1, described in greater detail herein.

Figure 3:
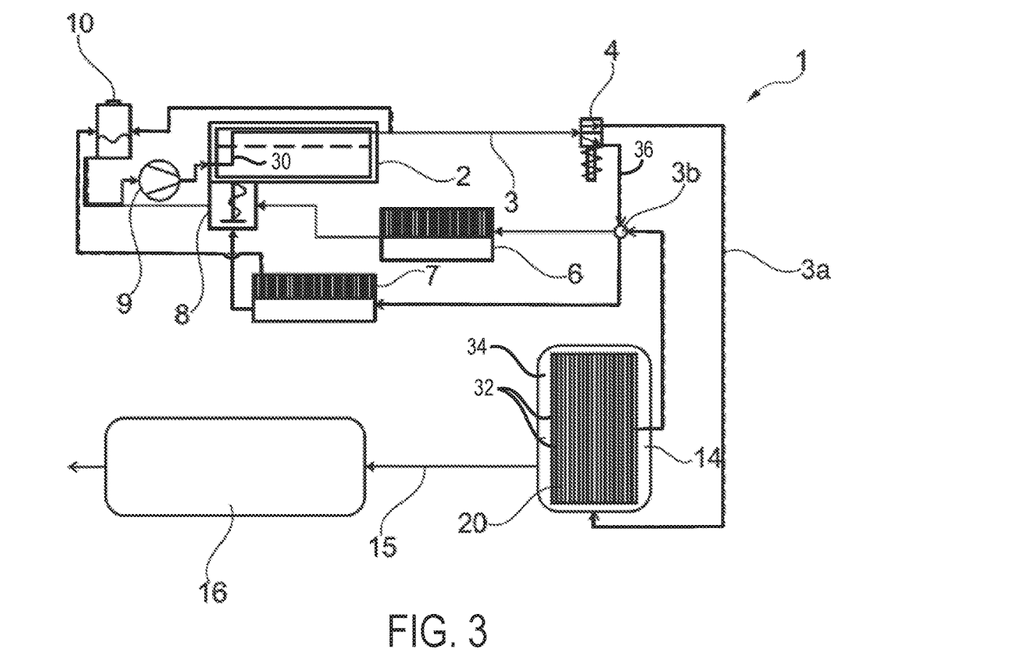
FIG. 3 shows a schematic illustration of a system for managing heat in an internal combustion engine.

In one example, in the system 1 in accordance with the illustration in FIG. 3, the urea tank 14 may be used to store heat. The aqueous urea solution contained in the urea tank may therefore be used as a storage medium for the heat energy. The urea tank 14 is connected to a heat exchanger 20. In this case, the heat exchanger 20 may be arranged in a recess on one side of the urea tank 14, with the result that it is accommodated in the circumference of the urea tank 14. In other words, the heat exchanger 20 may be surrounded on multiple sides by the material of the urea tank 14, increasing the efficiency of heat exchange. However in another example, the heat exchanger 20 may be arranged on an outer side of the urea tank 14 without a recess. In the heat exchanger 20, coolant line 3a and lines which lead out of the urea tank 14 and back into the latter come into thermal contact, that is to say that heat can be transferred between them. In one example, the urea tank 14 may have thermal insulation (not shown). Ideally, the urea tank 14 has a device for measuring the temperature of the urea solution.

The system 1 can include a coolant control valve 4 (e.g., coolant switching valve) that enables the urea tank 14 to be coupled to the cooling circuit. In this case, at least one additional pump (not shown) can be arranged in coolant line 3 in addition to a first coolant pump 9, said further pump pumping the coolant through coolant line 3 and to the heat exchanger 20. Instead of or in addition to the coolant control valve 4, a second coolant pump can be arranged in the first coolant line 3 or second coolant line 3a, pumping the coolant to the urea tank 14. A coolant reservoir 10 receiving coolant from the engine 2 and the cooling device 7, is also shown in FIG. 3. The cooling device 7 may be configured to release thermal energy absorbed in the coolant to the surrounding environment.

Similar to FIG. 2, the urea line 15 shown in FIG. 3 may be routed from the urea tank 14 to the urea metering device 16 and then onward to the urea injection device 17 and the exhaust tract 11, shown in FIG. 2.

If the urea tank 14 is coupled to the cooling circuit, coolant may be passed from the internal combustion engine 2 to the urea tank 14 in the first coolant line 3 and second coolant line 3a. The coolant flows through the heat exchanger 20 and there comes into contact with the urea solution flowing out of the urea tank 14 through lines provided for that purpose, through the heat exchanger 20 and back into the urea tank 14. However, in other examples, the heat exchanger 20 may be configured to transfer heat energy from the coolant to the reductant through a housing of the heat exchanger. If the coolant is warmer than the urea solution, heat is transferred from the coolant to the urea solution. Heat transferred from the coolant to the urea solution is then stored in the urea tank 14. If the urea solution is warmer than the coolant, heat is transferred from the urea solution to the coolant. The heat stored in the urea tank 14 may then be used, in starting phases of the internal combustion engine 2 for example, for rapid heating of the internal combustion engine 2 and other components, e.g., the transmission. From the heat exchanger 20, the coolant flows back to the internal combustion engine 2.

The heat exchanger 20 include coolant lines 32 extending through the heat exchanger. Additionally, the heat exchanger 20 is also coupled to an outer side 34 of the reductant tank 14. However, the heat exchanger 20 may be coupled to other locations of the reductant tank 14, such as at an interior location in the reductant tank, in other examples. Additionally in one example, the heat exchanger 20 may include reductant conduits extending therethrough. In the heat exchanger 20 the reductant conduits and the coolant lines may be in contact with one another to facilitate efficient heat transfer between the coolant and the reductant or vice versa.

FIG. 3 also depicts a heating device 6 for heating an interior of a motor vehicle in which the system is located and a thermostat 8 and the first coolant pump 9, which may be driven by the internal combustion engine 2 and by means of which the coolant is circulated through the coolant circuit. The coolant circuit also includes a coolant reservoir 10, from which the coolant circuit is supplied with coolant. As shown in FIG. 3 coolant may be flowed through an engine coolant conduit 30 extending through the engine 2. The engine coolant conduit 30 may be included in an engine cooling system having additional coolant conduits, such as coolant jackets in the cylinder head and/or engine block. The engine cooling system may also include the coolant pump 9, the coolant reservoir 10, and the thermostat 8 as well as additional valves, coolant lines, pumps, etc., that are not illustrated.

The engine coolant conduit 30 is coupled to the coolant pump 9 and the coolant line 3, in the depicted example. The coolant line 3 leads from the internal combustion engine 2 to the coolant control valve 4 which can selectively supply coolant to the heat exchanger 20. A bypass coolant line 36 is also coupled to the coolant control valve 4 and a junction point 3b. The urea line 15 and metering device 16 are also depicted in FIG. 3.

Figure 4:
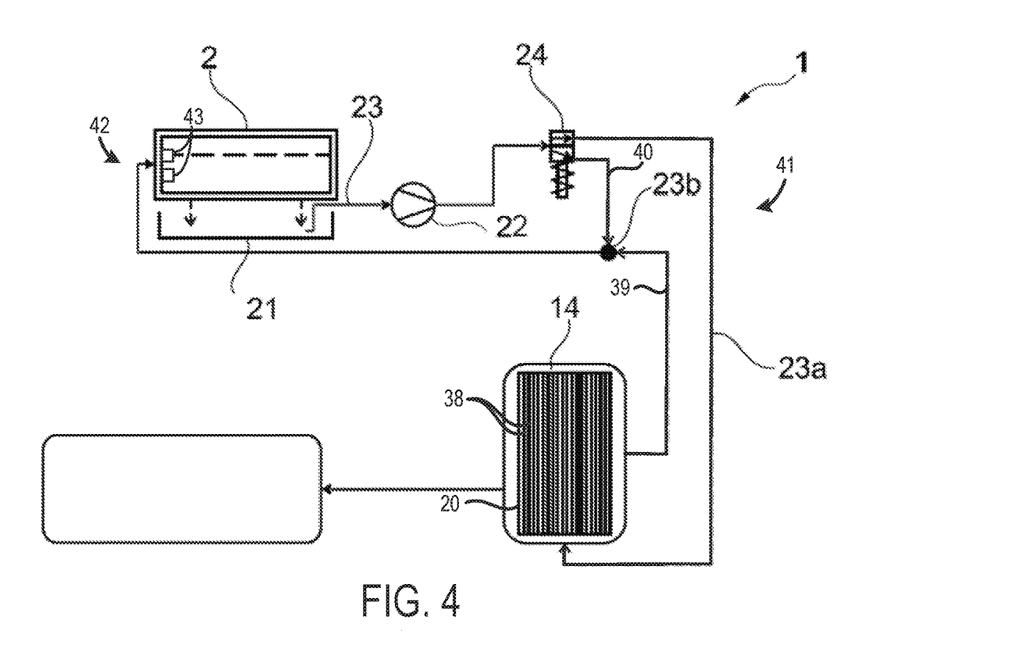
FIG. 4 shows a schematic illustration of another example of a system for managing heat in an internal combustion engine.

In another example shown in FIG. 4, the system 1 includes the urea tank 14 that is coupled thermally to the internal combustion engine 2 via an oil circuit 41. In this case, oil is passed out of an oil sump 21 (e.g., a wet oil sump) from the internal combustion engine 2 through a first oil line 23 by means of an oil pump 22. The oil sump 21 is included in an engine lubrication system 42 including one or more lubrication devices 43 configured to provide lubricant to different engine components, such as pistons, camshafts, a crankshaft, etc.

By means of an oil control valve 24 (e.g., oil switching valve), the oil circuit 41 may be thermally coupled to the urea tank 14, wherein the first oil line 23 is connected to a second oil line 23a. Similarly to coolant line 3a in FIG. 3, oil line 23a may lead through the heat exchanger 20, in which heat can be exchanged between the oil and the urea solution. Specifically, the heat exchanger 20 includes oil lines 38 extending therethrough which receives oil from the second oil line 23a and flow oil to the junction point 23b via oil line 39. At the junction point 23b, which may also has a control valve, the oil lines come back together. The method for heat transfer from the oil to the reductant is described in greater detail herein. A bypass oil line 40 is also provided in the oil circuit 41. The bypass oil line 40 enables oil to bypass the heat exchanger during desired periods.

In one example, the control system 95, shown in FIG. 2 may be configured to control the oil control valve 24, shown in FIG. 4. Specifically in one example, the control system may be configured to, during a first operating condition, command the oil control valve to flow oil from the oil sump to the heat exchanger to transfer heat from oil flowing through the heat exchanger to reductant stored in the reductant tank and during a second operating condition, command the oil control valve to flow oil from the oil sump to the heat exchanger to transfer heat from reductant stored in the reductant tank to oil flowing through the heat exchanger.

Figure 5:
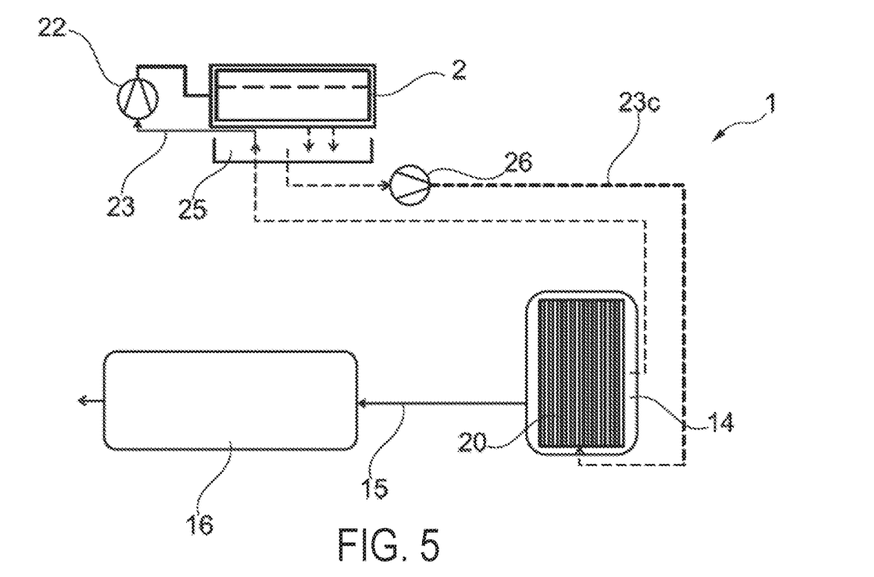
FIG. 5 shows a schematic illustration of another example of a system for managing heat in an internal combustion engine.

In another example shown in FIG. 5 the system 1 includes the internal combustion engine 2 which is connected thermally to the urea tank 14 by a third oil line 23c. In this case, the oil sump may be a dry oil sump 25, from which oil is pumped to the internal combustion engine 2 by means of the main oil pump 22 and to the urea tank 14 by means of an additional, electrically operated auxiliary oil pump 26. In this embodiment, there is no coolant line. FIG. 5 also shows the urea line 15, the metering device 16, and the heat exchanger 20.

Figure 6:
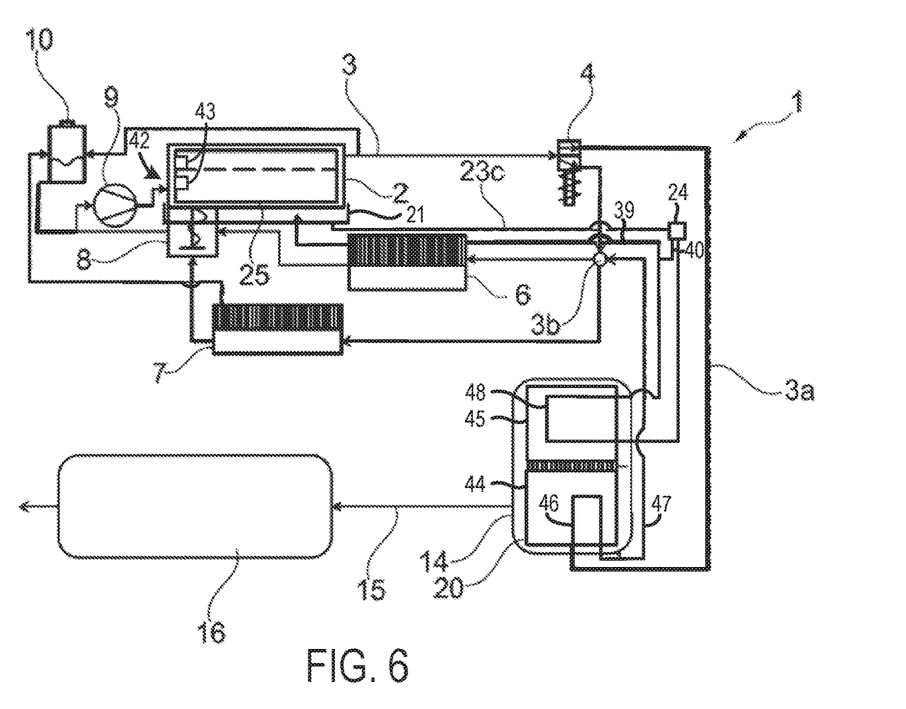
FIG. 6 shows a schematic illustration of another example of a system for managing heat in an internal combustion engine.

The illustration in FIG. 6 shows another example where, in the system 1, both the coolant line 3 and the oil line 23a connect the internal combustion engine 2 thermally to the urea tank 14. In this case, both coolant line 3 and oil line 23a may be passed through the heat exchanger 20 in such a way that they may be both in thermal contact with lines which lead out of the urea tank 14 and back into the latter but not with one another, in one example, with the result that the coolant and the oil can each exchange heat with the urea solution in the heat exchanger 20 but no heat can be transferred between the coolant and the oil.

Specifically in the example depicted in FIG. 6, the heat exchanger 20 includes a first section 44 and a second section 45. The first section 44 is configured to transfer heat energy from coolant to the reductant or vice versa while the second section 45 is configured to transfer heat from oil to the reductant or vice versa. The first section 44 includes a coolant line 46 extending therethrough and receives coolant from the coolant line 3a and flows coolant to coolant line 47 when the coolant control valve 4 is open and allowing coolant flow into coolant line 3a. The second section 45 includes an oil line 48 extending therethrough and receives oil from the oil line 23c and flows oil to oil line 39 when the oil control valve 24 is open and allowing oil flow into oil line 23c. The oil line 40 connected to the oil control valve 24 allowing oil to bypass the heat exchanger 20 is also shown in FIG. 6. It will be appreciated that the oil control valve 24 and the coolant control valve 4 may be correspondingly adjusted, by the control system 95 shown in FIG. 2, to alter the flowrate of the coolant and oil provided to the heat exchanger in tandem based on engine operating conditions, such as engine temperature, engine speed, coolant temperature, oil temperature, etc. For instance, the flowrate of oil to the heat exchanger may be increased while the flowrate of coolant to the heat exchanger may be decreased to provide a desired rate of heat energy transfer to/from the reductant. In another example, both the flowrates of the oil and coolant to the heat exchanger 20 may be increased or decreased in conjunction based on engine operating conditions.

Additionally, the oil control valve 24 and/or coolant control valve 4 may be adjusted based on the operating conditions in different emission control devices, such as a catalyst, to enable a desired reductant injection temperature to be reached to improve conversion efficiency.

FIG. 6 also depicts the engine lubrication system 42 including the lubrication devices 43 and the dry oil sump 25. However, in other examples, it will be appreciated that the oil sump 21, shown in FIG. 3, may be used in the arrangement of the system 1, shown in FIG. 6. FIG. 6 also depicts the heating device 6, cooling device 7, thermostat 8, coolant pump 9, coolant reservoir 10, urea line 15, and metering device 16.

Figure 7:
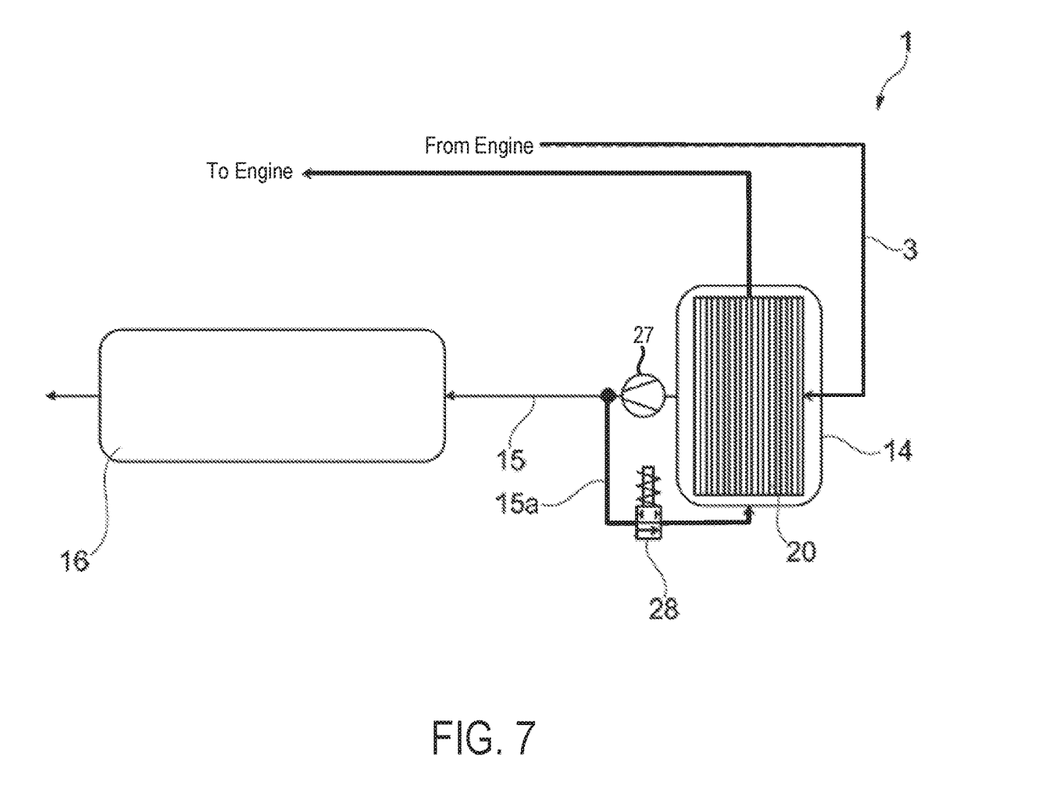
FIG. 7 shows a schematic illustration of another example of a system for managing heat in an internal combustion engine.

As shown in the example of the system 1 in FIG. 7, a branch line 15a branches off from the urea line 15 in the system 1. The branch line 15a is provided for returning the urea solution to the urea tank 14, wherein the branch line runs through the heat exchanger 20 before it discharges into the urea tank 14. At least one urea pump 27 is arranged in the urea line 15. The urea pump 27 pumps urea solution out of the urea tank 14 to the urea metering device 16. The urea metering device 16 provides urea or another suitable reductant to an injection device 17 via a reductant line. However in other examples, the urea metering device and the injection device may be integrated into a single component.

If a reductant control valve 28 (e.g., reductant switching valve) arranged at the branch point of the branch line 15a or in the branch line 15a is open, at least some of the urea solution is returned to the urea tank 14 by the action of the urea pump 27, in other words the urea solution is circulated. At least one further control valve (e.g., switching valve) can be arranged in the urea line 15 in order to bring about circulation of the urea solution so as to stop the flow of the urea solution to the metering device 16, thus ensuring that the urea solution is pumped back (e.g., completely back) to the urea tank 14. It is also possible for another urea pump to be arranged in the branch line 15a, if desired. Through the circulation of the urea solution through the heat exchanger 20, heat is transferred more effectively from or to the urea solution, in other words the heat transfer performance of the heat exchanger 20 is further enhanced.

Figure 8:
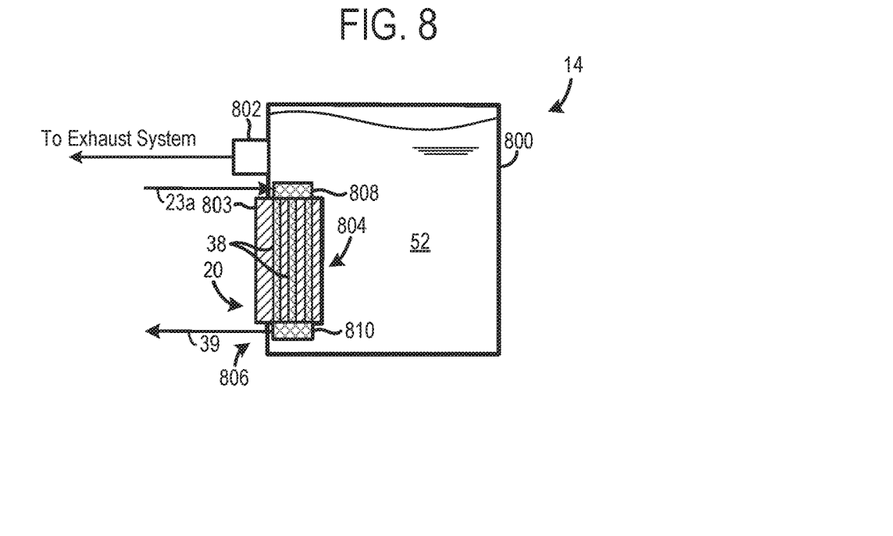
FIG. 8 shows a detailed illustration of a reductant tank and a heat exchanger.

FIG. 8 shows a detailed view of an exemplary reductant tank 14 and heat exchanger 20. It will be appreciated that the reductant tank 14 and heat exchanger 20 shown in FIG. 8 may be used in the engine system 1 shown in FIG. 4 or the other examples of the engine system 1 shown in FIGS. 2-3 and 5-7. The reductant tank 14 includes a housing 800 enclosing the reductant solution 52.

The reductant tank 14 includes an output port 802 providing reductant to an exhaust tract, such as exhaust tract 11 shown in FIG. 2, in an engine exhaust system. A return port may also be included in the reductant tank to enable reductant to be circulated through the tank, in other examples. In such an example, the system 1 may include the urea pump 27, reductant control valve 28, and urea line 15a, shown in FIG. 7, to enable reductant circulation through the reductant tank 14.

The heat exchanger 20 including a housing 803 enclosing the oil lines 38. The heat exchanger 20 is positioned a recess 804 of a side 806 of the housing 800, in the depicted example. As illustrated, the side 806 is an outer side of the reductant tank 14. However, in other examples the heat exchanger 20 may be coupled to an interior side of the reductant tank 14. In one specific example, the heat exchanger 20 may extend around (e.g., circumferentially enclose) the housing 800. However, other heat exchanger geometries have been contemplated. Alternatively in other examples, the heat exchanger 20 may also include reductant lines extending therethrough to increase the heat transfer rate between the oil and the reductant.

Additionally, the heat exchanger 20 includes an oil input port 808 receiving oil from oil line 23a and providing oil to oil lines 38 inside the heat exchanger. The heat exchanger 20 also includes and an oil output port 810 receiving oil from the oil lines 38 inside the heat exchanger and providing oil to oil line 39.

Figure 9:
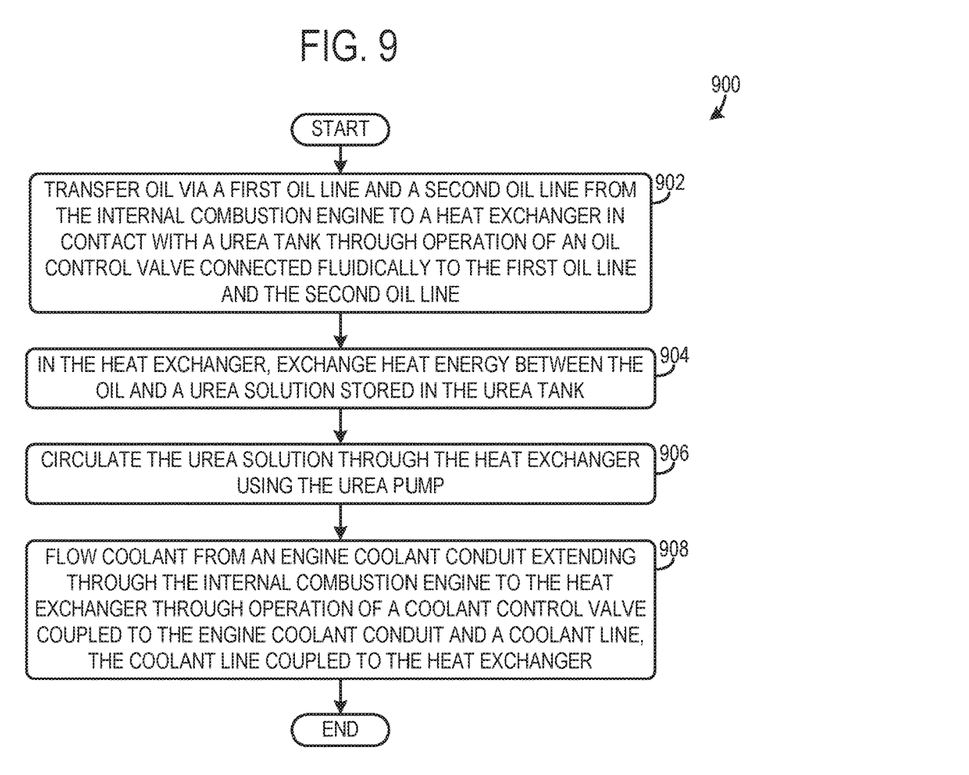
FIG. 9 shows a method for managing heat in an engine system.

FIG. 9 shows a method 900 for operation of a system. The method 900 may be implemented by one or more of the engine systems, control systems, etc., described above with regard to FIGS. 2-8 or may be implemented by other suitable engines and control systems.

At 902 the method includes transferring oil via a first oil line and a second oil line from the internal combustion engine to a heat exchanger in contact with a urea tank through operation of an oil control valve connected fluidically to the first oil line and the second oil line. It will be appreciated that operation of an oil control valve may include opening a valve port to enable oil flow into the second oil line.

Next at 904 the method includes in the heat exchanger, exchanging heat energy between the oil and a urea solution stored in the urea tank. In one example, the urea tank stores heat energy which is transferred from the oil to the urea solution when the temperature of the oil is higher than that of the urea solution. On the other hand, the urea tank may release heat energy by transferring energy from the urea solution to the oil when the temperature of the urea solution is higher than that of the oil.

At 906 the method includes circulating the urea solution through the heat exchanger using the urea pump. In this way, the heat transfer rate, in the heat exchanger, from oil to reductant or vice versa can be increased. It will be appreciated that step 906 and 904 may be implemented at overlapping time intervals, in one example.

At 908 the method includes flowing coolant from an engine coolant conduit extending through the internal combustion engine to the heat exchanger through operation of a coolant control valve coupled to the engine coolant conduit and a coolant line, the coolant line coupled to the heat exchanger. In this way, both coolant and oil can be flowed to the heat exchanger to increase the amount of heat transferred to the reductant in the heat exchanger or the amount of heat transferred from the reductant to the oil and coolant.

Figure 10:
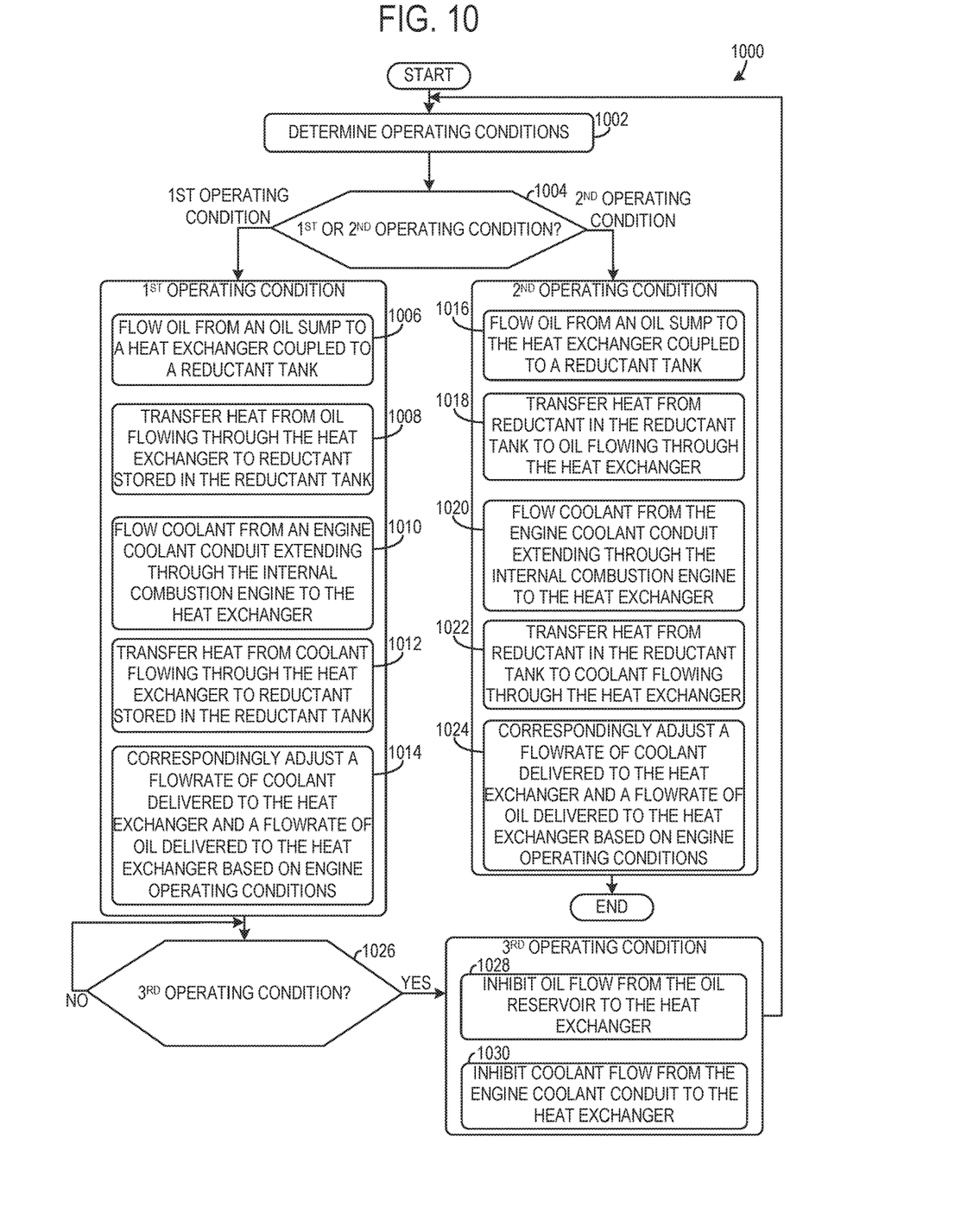
FIG. 10 shows another method for managing heat in an engine system.

FIG. 10 shows a method 1000 for operation of an engine system. The method 1000 may be implemented by one or more of the engine systems, control systems, etc., described above with regard to FIGS. 2-8 or may be implemented by other suitable engines and control systems.

At 1002 the method includes determining engine operating conditions. The engine operating conditions may include engine temperature, exhaust gas temperature, engine speed, exhaust gas composition, throttle position, vehicle speed, catalyst temperature, reductant temperature, oil temperature, etc.

Next at 1004 the method includes determining if a first or second operating condition is occurring in an engine system. It will be appreciated that the first operating condition may be a condition when an oil temperature and/or coolant temperature is greater than a reductant temperature. The second operating condition may be a condition when the reductant temperature is greater than the oil temperature and/or coolant temperature. Engine temperature and/or engine speed may be indicative of the oil temperature and the coolant temperature. As such, the first operating condition may include a condition in which the engine is above a threshold temperature, after engine warm-up for example, and the second operating condition may include a condition in which the engine is operating below a threshold temperature. Additionally, the first operating condition may include a condition where the engine is above a threshold speed and the second condition may include a condition where the engine is below a threshold speed (e.g., idle speed).

If it is determined that the first operating condition is occurring in the engine, method steps 1006-1014 are implemented. At 1006 the method includes flowing oil from an oil sump to a heat exchanger coupled to a reductant tank. Next at 1008 the method includes transferring heat from oil flowing through the heat exchanger to reductant stored in the reductant tank.

Next at 1010 the method includes flowing coolant from an engine coolant conduit extending through the internal combustion engine to the heat exchanger. At 1012 the method includes transferring heat from coolant flowing through the heat exchanger to reductant stored in the reductant tank. In one example, steps 1006-1012 may be implemented at overlapping periods. In such an example, heat energy can be transferred from both oil and coolant to the reductant to decrease the reductant warm up duration.

At 1014 the method includes correspondingly adjusting a flowrate of coolant delivered to the heat exchanger and a flowrate of oil delivered to the heat exchanger based on engine operating conditions. For instance, the oil delivered to the heat exchanger may be decreased while the coolant delivered to the heat exchanger is increased or vice versa. The flowrate adjustment of the oil and coolant may be based on lubrication needs of the engine lubrication system and/or coolant needs of the engine cooling system. For instance, increased lubrication may be desired during high load conditions. Thus, oil provided to the heat exchanger may be decreased during high load conditions to enable more oil to be provided by the oil sump to the engine lubrication system and coolant flowed to the heat exchanger may be correspondingly increased to enable a desired level of heat transfer to the reductant in the reductant tank to be achieved. In another example, increased cabin heating may be desired and therefore the coolant flow to the heat exchanger may be decreased while the oil flow to the heat exchanger is increased, enabling a greater amount of heat to be transferred from the coolant to the cabin heating system. In yet another example, both the coolant and oil flow to the heat exchanger may be increased when rapid heating of reductant is desired, such as when the reductant is below a desired injection temperature threshold.

Additionally, control of a reductant pump in the system may also be coordinated with control of the oil control valve and/or the coolant control valve to enable a desired level of heat transfer between the oil and the reductant and/or the coolant and the reductant to be realized. For instance, the flowrate of oil and/or coolant to the heat exchanger may be decreased while the flowrate of reductant to the heat exchanger may be increased or vice versa. Further in one example, the flowrate of the reductant through the heat exchanger may be increased while the flowrate of the oil and/or coolant to the heat exchanger is increased.

If it is determined that the second operating condition is occurring in the engine, method steps 1016-1024 are implemented. At 1016 the method includes flowing oil from the oil sump to the heat exchanger coupled to a reductant tank and at 1018 the method includes transferring heat from reductant in the reductant tank to oil flowing through the heat exchanger. At 1020 the method includes flowing coolant from the engine coolant conduit extending through the internal combustion engine to the heat exchanger and at 1022 the method includes transferring heat from reductant in the reductant tank to coolant flowing through the heat exchanger. At 1024 the method includes correspondingly adjusting a flowrate of coolant delivered to the heat exchanger and a flowrate of oil delivered to the heat exchanger based on engine operating conditions. The different options for coordinating adjustment of coolant and oil flow to the heat exchanger have been previously described.

After step 1014 the method advances to step 1026 where the method includes determining if a third operating condition is occurring in the engine. The third operating condition may include a condition where the temperature of the reductant is greater than a threshold value or a condition where the temperature of the oil, coolant, and/or reductant are each within a predetermined range. It will be appreciated that the third operating condition may temporally occur between the first operating condition and the second operating condition, in one instance. Thus, the third operating condition can be construed as a condition where heat energy storage in the reductant is desired between periods of heat energy transfer between the reductant and the oil and/or coolant.

If it is determined that the third operating is not occurring the method returns to 1026. However, if it is determined that the third operating condition is occurring the method implements step 1028 and 1030. At 1028 the method includes inhibiting oil flow from the oil reservoir to the heat exchanger and at 1030 the method includes inhibiting coolant flow from the engine coolant conduit to the heat exchanger. The prevention of coolant and oil flow to the heat exchanger enables heat energy to be stored in the reductant tank for later use. After the third operating condition the method returns to step 1002.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described routines. The subject matter of the present disclosure includes all novel and non-obvious combinations and sub-combinations of the various systems and configurations, and other features, functions, and/or properties disclosed herein.

The invention claimed is:
1. A method for heat management in a system of an internal combustion engine comprising:
    during a first operating condition, flowing an oil from an oil sump to a heat exchanger attached to a reductant tank and transferring heat from the oil flowing through the heat exchanger to a reductant stored in the reductant tank;

during the first operating condition, flowing coolant from an engine coolant conduit extending through the internal combustion engine to the heat exchanger through operation of a coolant control valve coupled to the engine coolant conduit and a coolant line, where the coolant line is coupled to the heat exchanger, and transferring heat from coolant to a reductant solution in the heat exchanger;

during the first operating condition, correspondingly adjusting a flowrate of the coolant delivered to the heat exchanger and a flowrate of the oil delivered to the heat exchanger based on engine operating conditions;

during a second operating condition, flowing the oil from the oil sump to the heat exchanger and transferring heat from the reductant stored in the reductant tank to the oil flowing through the heat exchanger; and during the second operating condition, flowing the coolant from the engine coolant conduit extending through the internal combustion engine to the heat exchanger through operation of the coolant control valve coupled to the engine coolant conduit and the coolant line, the coolant line transferring heat from the reductant solution to the coolant in the heat exchanger;

where correspondingly adjusting the flowrates of the coolant and the oil delivered to the heat exchanger includes decreasing coolant flow through the heat exchanger through operation of the coolant control valve while increasing oil flow through the heat exchanger through operation of an oil control valve.

2. The method of claim 1, wherein the reductant tank stores heat energy which is transferred from the oil to the reductant solution when a temperature of the oil is higher than that of the reductant solution.

3. The method of claim 1, wherein the reductant tank releases heat energy by transferring energy from the reductant solution to the oil when a temperature of the reductant solution is higher than that of the oil.

4. The method of claim 1, wherein the reductant tank has at least one recess in at least one side and wherein the heat exchanger is accommodated in the at least one recess of the reductant tank.

5. The method of claim 1, wherein the heat exchanger is arranged on at least one outer side of the reductant tank.

6. The method of claim 1, wherein a reductant line, in which at least one reductant pump is arranged, is arranged between the reductant tank and an injection device for introducing the reductant solution into an exhaust tract of the internal combustion engine, wherein at least one branch line for returning the reductant solution to the reductant tank branches off from the reductant line, wherein the branch line runs through the heat exchanger, and wherein the method further comprises circulating the reductant solution through the heat exchanger using the reductant pump.

7. An engine system comprising:
a reductant tank storing a reductant solution coupled to an injection device configured to inject the reductant solution into an exhaust tract;
an engine lubrication system including an oil sump;
an oil circuit including,
a first oil line coupled to the oil sump and an oil control valve,
a second oil line coupled to the oil control valve and a heat exchanger, where the heat exchanger is attached to the reductant tank,
a third oil line coupled to the heat exchanger and the engine lubrication system, and
a bypass oil line coupled to the oil control valve and the engine lubrication system bypassing the heat exchanger;
an engine coolant conduit extending through an internal combustion engine and a coolant control valve coupled to the engine coolant conduit and a coolant line, where the coolant line is coupled to the heat exchanger; and
a control system configured to:
adjust the oil control valve based on one or more engine operating conditions to alter an amount of an oil flowing to the heat exchanger; and
adjust the coolant control valve to alter a flowrate of a coolant to the heat exchanger based on a flowrate of the oil delivered to the heat exchanger.

8. The engine system of claim 7, where the control system is configured to, during a first operating condition, command the oil control valve to flow oil from the oil sump to the heat exchanger to transfer heat from oil flowing through the heat exchanger to the reductant solution stored in the reductant tank and during a second operating condition, command the oil control valve to flow oil from the oil sump to the heat exchanger to transfer heat from the reductant solution stored in the reductant tank to oil flowing through the heat exchanger.

9. The engine system of claim 8, where the control system is configured to correspondingly adjust the flowrate of the coolant and the flowrate of the oil delivered to the heat exchanger based on engine temperature.

10. A method for operating an engine system comprising:
during a first operating condition, flowing an oil from an oil sump to a heat exchanger attached to a reductant tank and transferring heat from the oil flowing through the heat exchanger to a reductant stored in the reductant tank;

during the first operating condition, flowing coolant from an engine coolant conduit extending through an internal combustion engine to the heat exchanger through operation of a coolant control valve coupled to the engine coolant conduit and a coolant line, where the coolant line is coupled to the heat exchanger, and transferring heat from coolant to a reductant solution in the heat exchanger;

during the first operating condition, correspondingly adjusting a flowrate of the coolant delivered to the heat exchanger and a flowrate of the oil delivered to the heat exchanger based on engine operating conditions;

during a second operating condition, flowing the oil from the oil sump to the heat exchanger and transferring heat from the reductant stored in the reductant tank to the oil flowing through the heat exchanger; and during the second operating condition, flowing the coolant from the engine coolant conduit extending through the internal combustion engine to the heat exchanger through operation of the coolant control valve coupled to the engine coolant conduit and the coolant line, the coolant line transferring heat from the reductant solution to the coolant in the heat exchanger;

where correspondingly adjusting the flowrates of the coolant and the oil delivered to the heat exchanger includes increasing coolant flow through the heat exchanger through operation of the coolant control valve while decreasing oil flow through the heat exchanger through operation of an oil control valve.

11. The method of claim 10, further comprising during a third operating condition inhibiting oil flow from the oil sump to the heat exchanger, where the third operating condition temporally occurs between the first operating condition and the second operating condition.

12. The method of claim 10, where the first operating condition includes a condition where a temperature of the oil is greater than a temperature of the reductant stored in the reductant tank and where the second operating condition includes a condition where a temperature of the engine oil is less than a temperature of the reductant stored in the reductant tank.

* * * * *